United States Patent
Kim et al.

(10) Patent No.: US 12,456,534 B2
(45) Date of Patent: Oct. 28, 2025

(54) STORAGE DEVICES HAVING ENHANCED ERROR DETECTION AND MEMORY CELL REPAIR

(71) Applicant: Samsung Electronics Co., Ltd., Suwon-si (KR)

(72) Inventors: Dong Kim, Suwon-si (KR); Inhoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/508,903

(22) Filed: Nov. 14, 2023

(65) Prior Publication Data
US 2024/0257889 A1    Aug. 1, 2024

(30) Foreign Application Priority Data
Jan. 27, 2023   (KR) .................... 10-2023-0011191

(51) Int. Cl.
*G11C 29/02* (2006.01)
*G11C 29/00* (2006.01)

(52) U.S. Cl.
CPC ............ *G11C 29/022* (2013.01); *G11C 29/76* (2013.01); *G11C 29/789* (2013.01)

(58) Field of Classification Search
CPC ... G11C 29/022; G11C 29/076; G11C 29/789; G11C 11/4085
See application file for complete search history.

(56) References Cited

U.S. PATENT DOCUMENTS

| | | | |
|---|---|---|---|
| 9,627,095 B1 | 4/2017 | Xu et al. | |
| 11,068,347 B2 | 7/2021 | Kim et al. | |
| 11,276,445 B2 | 3/2022 | Kim et al. | |
| 11,302,414 B2 | 4/2022 | Kim et al. | |
| 11,309,054 B2 | 4/2022 | Jung et al. | |
| 2015/0154943 A1* | 6/2015 | Lee | G09G 5/006 345/204 |

(Continued)

*Primary Examiner* — Han Yang
(74) *Attorney, Agent, or Firm* — Wolf, Greenfield & Sacks, P.C.

(57) ABSTRACT

A storage device includes a volatile memory and a storage controller, which is configured to control the volatile memory. The volatile memory includes a memory cell array, which has a plurality of sub-cell arrays therein, and a plurality of sub-wordline driver blocks, which are configured to drive sub-wordlines electrically connected to at least one of the plurality of sub-cell arrays. The storage controller includes: a volatile memory interface configured to transmit data to and receive data from the volatile memory, and detect an error bit(s) of data output from the volatile memory, a working memory configured to store a structure map table, which maps unit areas of the volatile memory, the sub-wordlines, and the plurality of sub-wordline driver blocks, and a processor, which is configured to: update an error count of a unit area of the volatile memory that corresponds to the error bit(s) detected from the volatile memory interface to the structure map table, detect at least one of a defective sub-wordline and defective sub-wordline driver block, by accessing the structure map table, and then repair at least one memory cell connected to the defective sub-wordline and/or repair at least one memory cell associated with the defective sub-wordline driver block.

20 Claims, 12 Drawing Sheets

(56) References Cited

U.S. PATENT DOCUMENTS

2020/0090759 A1\* 3/2020 Sharma ............... G11C 11/5635
2020/0151070 A1 5/2020 Lee et al.
2021/0026728 A1 1/2021 Kim et al.

\* cited by examiner

216

| Logical ADDR | SWDB Index | SWL Index | Error Count | |
|---|---|---|---|---|
| 0x00_007F | SWDB1 | SWL1 | | ⎫ |
| 0x00_00FF | SWDB3 | SWL2 | X | ⎬ ROW1 |
| 0x00_017F | SWDB3 | SWL2 | Y | |
| 0x00_01FF | SWDB5 | SWL3 | Z | ⎭ |
| 0x00_027F | SWDB2 | SWL4 | | ⎫ |
| 0x00_02FF | SWDB2 | SWL4 | | ⎬ ROW2 |
| 0x00_037F | SWDB4 | SWL5 | | |
| 0x00_03FF | SWDB4 | SWL5 | | ⎭ |
| 0x00_047F | SWDB1 | SWL6 | | ⎫ |
| 0x00_04FF | SWDB3 | SWL7 | | ⎬ ROW3 |
| 0x00_057F | SWDB3 | SWL7 | | |
| 0x00_05FF | SWDB5 | SWL8 | W | ⎭ |
| ... | ... | ... | ... | |

FIG. 6

STORAGE DEVICES HAVING ENHANCED ERROR DETECTION AND MEMORY CELL REPAIR

REFERENCE TO PRIORITY APPLICATION

This application claims priority to Korean Patent Application No. 10-2023-0011191, filed Jan. 27, 2023, the disclosure of which is hereby incorporated herein by reference in its entirety.

BACKGROUND

Example embodiments of the present disclosure relate to storage devices and, more particularly, to volatile memory devices.

A volatile memory, such as a dynamic random access memory (DRAM), may operate in units of rows when writing data to or reading data from a memory cell. Memory cells included in one row may be connected to a wordline, and the wordline may be driven by a wordline driver. In order to distribute a load applied to the wordline driver, the memory cells may be connected to a plurality of sub-wordlines in a divided manner, and the plurality of sub-wordlines may be driven using a plurality of sub-wordline driver blocks.

A volatile memory may support post package repair (PPR) to repair defects occurring after being packaged. For example, a volatile memory may include redundancy memory cells, and memory cells repeatedly causing errors may be replaced with the redundancy memory cells.

SUMMARY

An example embodiment of the present disclosure is to provide a storage device that can detect defects occurring in sub-wordlines or sub-wordline driver blocks of a volatile memory, and can repair those defects.

An example embodiment of the present disclosure is to provide a storage device that may, by varying a range of repair execution depending on a type of defects detected in a volatile memory, effectively prevent a system error caused by the defects.

According to an example embodiment of the present disclosure, a storage device includes a volatile memory and a storage controller, which is configured to control the volatile memory. The volatile memory includes a memory cell array, which has a plurality of sub-cell arrays therein, and a plurality of sub-wordline driver blocks, which are configured to drive sub-wordlines electrically connected to at least one of the plurality of sub-cell arrays. The storage controller can include: a volatile memory interface configured to transmit data to and receive data from the volatile memory and detect an error bit(s) of data output from the volatile memory, a working memory configured to store a structure map table, which maps unit areas of the volatile memory, the sub-wordlines, and the plurality of sub-wordline driver blocks, and a processor. The processor may be configured to: (i) update an error count of a unit area of the volatile memory that corresponds to the error bit(s) detected from the volatile memory interface to the structure map table, (ii) detect at least one of a defective sub-wordline and defective sub-wordline driver block, by accessing the structure map table, and (iii) repair at least one memory cell connected to the defective sub-wordline and/or repair at least one memory cell associated with the defective sub-wordline driver block, in response to the detection of the at least one of a defective sub-wordline and defective sub-wordline driver block.

According to another example embodiment of the present disclosure, a storage device includes first and second volatile memories including a memory cell array including multiple sub-cell arrays, and sub-wordline driver blocks configured to drive sub-wordlines connected to one or more sub-cell arrays among the plurality of sub-cell arrays. In some of these embodiments, the plurality of sub-cell arrays and the sub-wordline driver blocks of the first and second volatile memories have different connection structures relative to each other. A storage controller is also provided, which is configured to control the first and second volatile memory. In some embodiments, the storage controller may include a first volatile memory interface configured to transmit data to and receive data from the first volatile memory, and a second volatile memory interface configured to transmit data to and receive data from the second volatile memory, a working memory configured to store a first structure map table representing mapping of a unit area, a sub-wordline, and a sub-wordline driver block of the first volatile memory, and a second structure map table representing mapping of a unit area, a sub-wordline, and a sub-wordline driver block of the second volatile memory. The storage controller may also include a processor, which is configured to update error counts for each unit area of the first and second volatile memories to the first and second structure map tables, respectively, to detect a defective sub-wordline or a defective sub-wordline driver block by referring to the first and second structure map tables, and to repair memory cells connected to the defective sub-wordline or to repair memory cells related to the defective sub-wordline driver block depending on a result of the detection.

According to a further example embodiment of the present disclosure, a storage device includes a volatile memory and a storage controller configured to control the volatile memory. The volatile memory may include a memory cell array, which includes: (i) a plurality of sub-cell arrays having memory cells connected to a plurality of unit wordlines, with the plurality of sub-cell arrays being arranged in a first direction, (ii) sub-wordline driver blocks adjacent to one or more of the sub-cell arrays in the first direction, and (iii) a plurality of sub-wordline drivers, which are each configured to drive one or more unit wordlines connected to one or more adjacent sub-cell arrays as a single sub-wordline. In addition, the storage controller is configured to determine memory cells connected to the plurality of unit wordlines as a unit area, to detect a defective sub-wordline among the plurality of sub-wordlines based on an error count of one or more unit areas related to the plurality of sub-wordlines included in the volatile memory, and to repair one or more unit areas related to the defective sub-wordline depending on a result of the detection.

BRIEF DESCRIPTION OF DRAWINGS

The above and other aspects, features, and advantages of the present disclosure will be more clearly understood from the following detailed description, taken in combination with the accompanying drawings, in which:

FIG. 6 is a diagram illustrating a structure map table stored in a storage device according to an example embodiment of the present disclosure;

DETAILED DESCRIPTION

Hereinafter, embodiments of the present disclosure will be described as follows with reference to the accompanying drawings.

Figure 1:
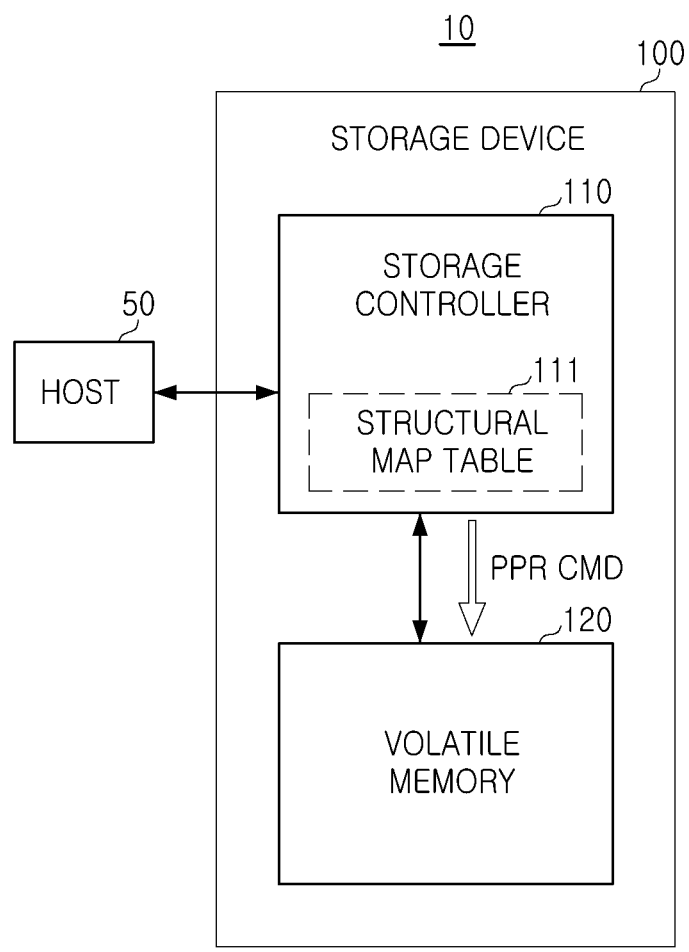
FIG. 1 is a diagram illustrating an electronic system according to an example embodiment of the present disclosure.

FIG. 1 is a diagram illustrating an electronic system 10 according to an example embodiment, which may include a host 50 and a storage device 100. The storage device 100 may include a storage controller 110 and a volatile memory 120. In some embodiments, the host 50 may include electronic devices including portable electronic devices such as a mobile phone, an MP3 player, a laptop computer, or a desktop computer, a game consoles, a TV, and a projector. The host 50 may include at least one operating system (OS). The operating system may perform overall management, and control functions and operations of the host 50.

The storage device 100 may include storage media for storing data in response to a request from the host 50. As a first example, the storage device 100 may be implemented as a compute express link CXL expansion memory. When the storage device 100 is a CXL expansion memory, the storage device 100 may conform to the CXL standard based on the peripheral component interconnect express (PCIe) standard. The storage device 100 may provide an extended memory space to the host 50. For example, the storage device 100 may provide a common memory space to heterogeneous processors such as CPUs and a GPU included in the host 50.

As a second example embodiment, the storage device 100 may include at least one of a solid state drive (SSD), an embedded memory, and a removable external memory. When the storage device 100 is an SSD, an embedded memory, or an external memory, the storage device 100 may further include a nonvolatile memory device. When the storage device 100 is an SSD, the storage device 200 may be a device conforming to the non-volatile memory express (NVMe) standard. When the storage device 100 is an embedded memory or an external memory, the storage device 100 may conform to a universal flash storage (UFS) or embedded multi-media card (eMMC) standard. The host 50 and the storage device 100 may generate and transmit a packet in accordance with an adopted standard protocol.

The volatile memory 120 may be implemented as, for example, a dynamic random access memory (DRAM). For example, when the storage device 100 is a CXL expansion memory or an enterprise SSD, a high-capacity volatile memory 120 may be employed.

To distribute a load applied to the wordline driver, the volatile memory 120 may divide memory cells included in one row and may connect the memory cells to a plurality of sub-wordlines, and may drive a plurality of sub-wordlines using a plurality of sub-wordline drivers. The volatile memory 120 may support post package repair (PPR) in which defective memory cells are replaced with redundancy memory cells in order to repair defects that occur after device packaging and in the field.

The storage controller 110 may control overall operation of the storage device 100. For example, the storage controller 110 may store data in the volatile memory 120 in response to a request from the host 50, and may provide data stored in the volatile memory 120 to the host 50 in response to a request of the host 50. The storage controller 110 may detect a defect of the volatile memory 120 and repair the detected defect. For example, in some embodiments, the storage controller 110 may detect memory cells repeatedly causing errors in the volatile memory 120 based on errors detected from data read out from the volatile memory 120. The storage controller 110 may control the volatile memory 120 to replace the detected memory cells with redundancy memory cells by providing a PPR command CMD to the volatile memory 120.

In some embodiments, the storage controller 110 may provide commands in a row unit when writing data to the volatile memory 120 or reading data from the volatile memory 120. Generally, to repair the defect of the volatile memory 120, the storage controller 110 may perform an error count for each row, and may provide a PPR command to the volatile memory 120 to replace a row repeatedly causing an error with a redundancy row based on the error count. However, error count information for each row may be insufficient to detect a structural defect of the volatile memory 120, and due to the insufficient information, it may be difficult for the storage controller 110 to perform repairing within an optimal range.

As a first example, even when there is a defect in a portion of sub-wordlines included in a row, the storage controller 110 may control the volatile memory 120 to repair the entire row based on the error count of the row. Unfortunately, because a conventional volatile memory 120 typically repairs the memory cells connected to the sub-wordline and also the entire row, redundancy memory cells may be wasted.

As another example embodiment, even when there is a defect in one of the sub-wordline drivers driving a row, the storage controller 110 may control the volatile memory 120 to repair only the row based on the error count of the row. When there is a defect in the sub-wordline driver, another sub-wordline driver included in the same sub-wordline driver block as the sub-wordline driver and electrically connected to the sub-wordline driver may not normally operate. When the volatile memory 120 repairs only the row, additional errors, which may occur in other rows related to other sub-wordline drivers, may not be prevented.

In a further example embodiment, the storage controller 110 may store a structure map table 111 representing a relationship between a unit area, a sub-wordline, and a sub-wordline driver block of a volatile memory 120, and may perform error count for each unit area. The storage controller 110 may, by referring to the structure map table 111, determine an error count of a sub-wordline and an error count of a sub-wordline driver block based on the error count for each unit area. Furthermore, the storage controller 110 may detect a defect of a sub-wordline or a defect of a sub-wordline driver based on an error count of a sub-wordline and a sub-wordline driver block, and may control the volatile memory 120 to repair an optimal range of memory cells.

Figure 2:
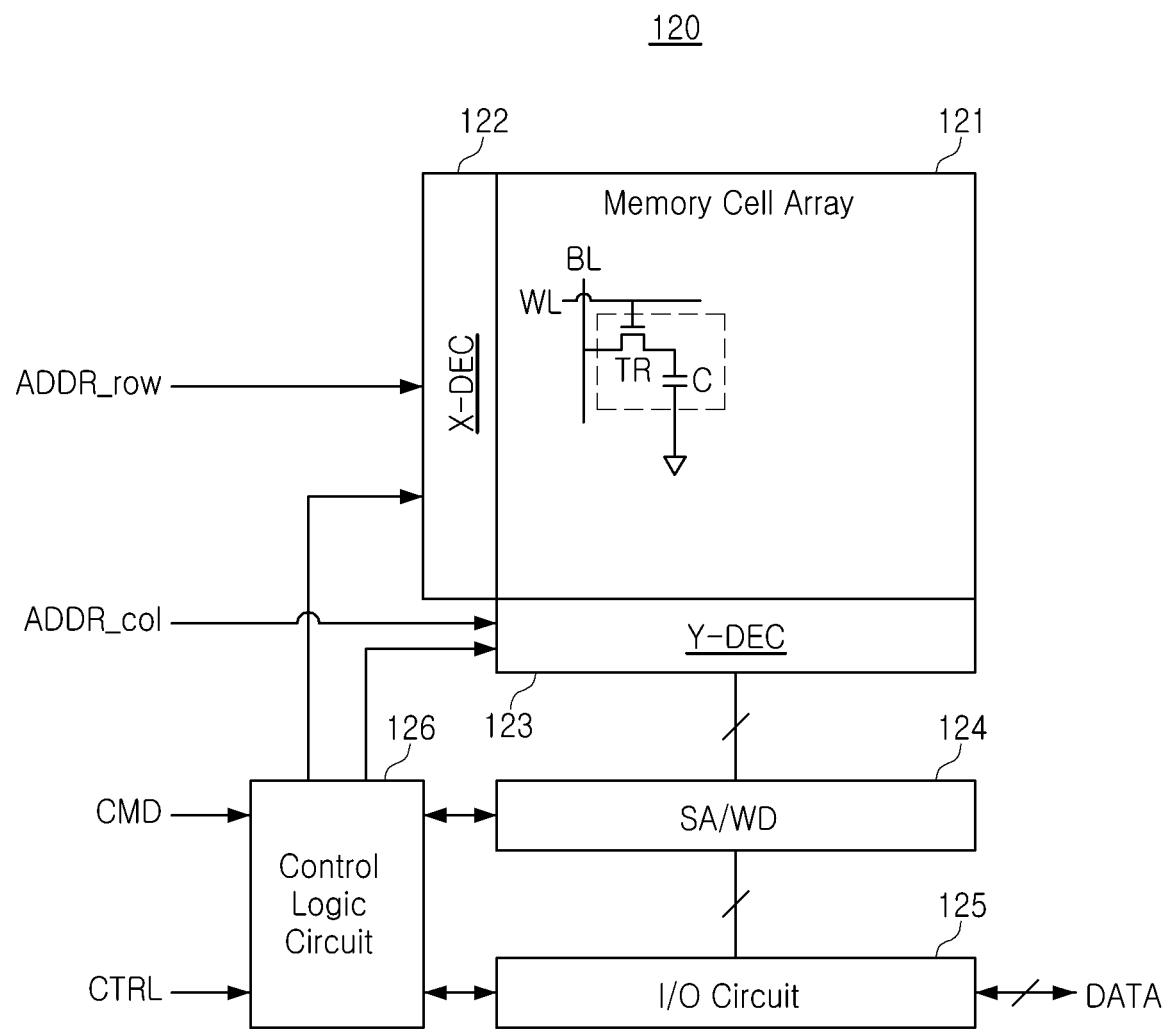
FIG. 2 is a diagram illustrating a volatile memory according to an example embodiment of the present disclosure.

Hereinafter, the structure of a volatile memory having sub-wordlines and sub-wordline drivers will be described in greater detail with reference to FIGS. 2 and 3. In FIG. 2, a volatile memory 120 according to an embodiment may correspond to the volatile memory 120 in FIG. 1. The volatile memory 120 may include a memory cell array 121 and peripheral circuits. The peripheral circuits may include an X-decoder 122, a Y-decoder 123, a sense amplifier and a write driver 124, an input/output circuit 125, and a control logic circuit 126. In some embodiments, the volatile memory 120 may be implemented as a dynamic random access (DRAM) device, but is not limited thereto.

The memory cell array 121 may include memory cells MC connected to a plurality of wordlines WL and a plurality of bitlines BL. Each of the memory cells MC may include a select transistor TR and a storage capacitor C. The select transistor TR may be connected between the storage capacitor C and the bitline BL and may operate in response to a voltage of the wordline WL. The storage capacitor C may be connected between the select transistor C and the first node, and may store data depending on an operation of the select transistor TR and a level of the bitline BL.

The X-decoder 122 may be connected to the memory cell array 121 through a plurality of wordlines WL. The X-decoder 122 may be configured to decode a row address ADDR_row provided from an external device (e.g., a memory controller) and may control voltages of a plurality of wordlines WL based on the decoding result. In contrast, the Y-decoder 123 may be connected to the memory cell array 121 through a plurality of bitlines BL. The Y-decoder 123 may be configured to decode a column address ADDR_col provided from an external device (e.g., a memory controller) and to control a plurality of bitlines BL based on the decoding result.

The sense amplifier and write driver 124 may be configured to read out data stored in the memory cell array 121 or to store data in the memory cell array 121 through the plurality of bitlines BL. The input/output circuit 125 may exchange data with an external device (e.g., a memory controller). The input/output circuit 125 may provide the data received from the external device to the sense amplifier and the write driver 124 or may provide the data received from the sense amplifier and the write driver 124 to an external device. The control logic circuit 126 may be configured to control various components of the memory device 100 in response to a command CMD or a control signal CTRL received from an external device. The memory cell array 121 may include a plurality of sub-cell arrays, and the X-decoder 122 may include sub-wordline driver blocks for driving sub-wordlines connected to the plurality of sub-cell arrays. The plurality of sub-cell arrays and the sub-wordline driver blocks will be described in greater detail with reference to FIG. 3.

Figure 3:
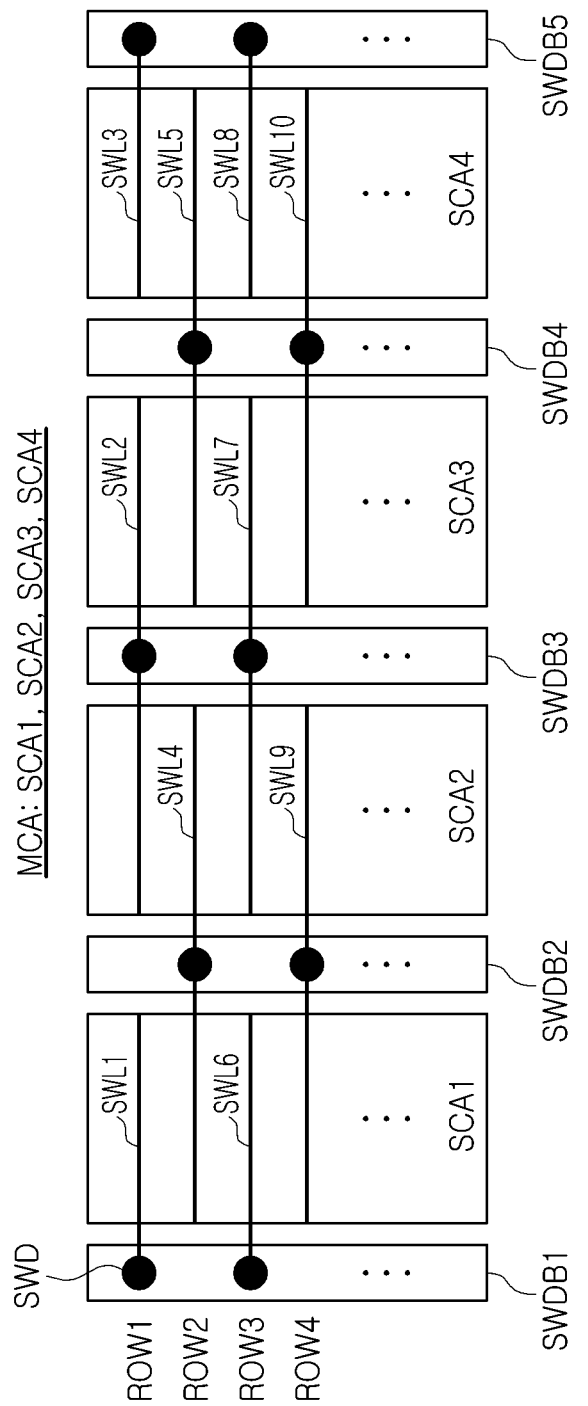
FIG. 3 is a diagram illustrating sub-cell arrays and sub-wordline driver blocks of a volatile memory according to an example embodiment of the present disclosure.

FIG. 3 is a diagram illustrating sub-cell arrays and sub-wordline driver blocks of a volatile memory according to an example embodiment. In particular, the memory cell array MCA in FIG. 3 may correspond to the memory cell array 121 described with reference to FIG. 2. The memory cell array MCA may include a plurality of sub-cell arrays SCA1-SCA4. The plurality of sub-cell arrays SCA1-SCA4 may be arranged in the first direction. Each of the plurality of sub-cell arrays SCA1-SCA4 may include a plurality of memory cells connected to a plurality of unit wordlines. Memory cells connected to unit wordlines having the same position offset in each of a plurality of sub-cell arrays SCA1-SCA4 may be included in a row.

FIG. 3 illustrates the example in which a memory cell array MCA may include four sub-cell arrays SCA1-SCA4, but the number of sub-cell arrays included in the memory cell array MCA is not limited thereto. The volatile memory 120 may include a plurality of sub-wordline driver blocks SWDB1-SWDB5. For example, the plurality of sub-wordline driver blocks SWDB1-SWDB5 may correspond to the row decoder 122 described with reference to FIG. 2.

Each of the plurality of sub-wordline driver blocks SWDB1-SWDB5 may be disposed adjacent to at least one of the sub-cell arrays SCA1-SCA4 in the first direction. For example, the first and fifth sub-wordline driver blocks SWDB1 and SWDB5 may be adjacent to one sub-cell array on the first-direction edge of the memory cell array MCA. The second to fourth sub-wordline driver blocks SWDB2-SWDB4 may be disposed between two sub-cell arrays adjacent to each other among the sub-cell arrays SCA1-SCA4.

Each of the plurality of sub-wordline driver blocks SWDB1-SWDB5 may include a plurality of sub-wordline drivers SWD. Each sub-wordline driver SWD may be connected to one or more unit wordlines of one or more adjacent sub-cell arrays, and may drive the connected one or more unit wordlines as a single sub-wordline. For example, each of the sub-wordline drivers included in the first sub-wordline driver block SWDB1 may be connected to one unit wordline of the adjacent first sub-cell array SCA1, and may drive the unit wordline as the first sub-wordline SWL1, the sixth sub-wordline SWL6, and the like. Similarly, the sub-wordline drivers included in the fifth sub-wordline driver block SWDB5 may drive unit wordlines of an adjacent fourth sub-cell array (SCA4) as the third sub-wordline SWL3, the eighth sub-wordline SWL8, and the like.

Each of the sub-wordline drivers included in the second sub-wordline driver block SWDB2 may be connected to one unit wordline in each of the adjacent first and second sub-cell arrays SCA1 and SCA2, and the connected unit wordlines may be driven as the fourth sub-wordline SWL4, the ninth sub-wordline SWL9, and the like. Similarly, sub-wordline drivers included in the third sub-wordline driver block SWDB3 may drive unit wordlines of adjacent second and third sub-cell arrays SCA2 and SCA3 as the second sub-wordline SWL2, the seventh sub-wordline SWL7, and the like, and the sub-wordline drivers included in the fourth sub-wordline driver block SWDB4 may drive unit wordlines of adjacent third and fourth sub-cell arrays SCA3 and SCA4 as the fifth sub-wordline SWL5, the tenth sub-wordline SWL10, and the like. In some embodiments, the sub-wordline drivers included in one sub-wordline driver block may be electrically connected to each other. Unfortunately, when a defect occurs in a portion of a sub-wordline driver block, there may be risk that the entirety of the sub-wordlines related to the sub-wordline driver block may malfunction.

In an example embodiment, when the storage controller 110 described with reference to FIG. 1 detects a defect of one sub-wordline included in the volatile memory 120, memory cells connected to the sub-wordline may be replaced with redundancy memory cells. A defect in a sub-wordline may include a defect in the sub-wordline thereof and a defect in a memory cell connected to the sub-wordline. Also, when the storage controller 110 detects a defect in the sub-wordline driver block included in the volatile memory 120, the memory related to the entirety of the sub-wordlines driven by the sub-wordline driver block cells may be replaced with reserved memory cells.

Figure 4:
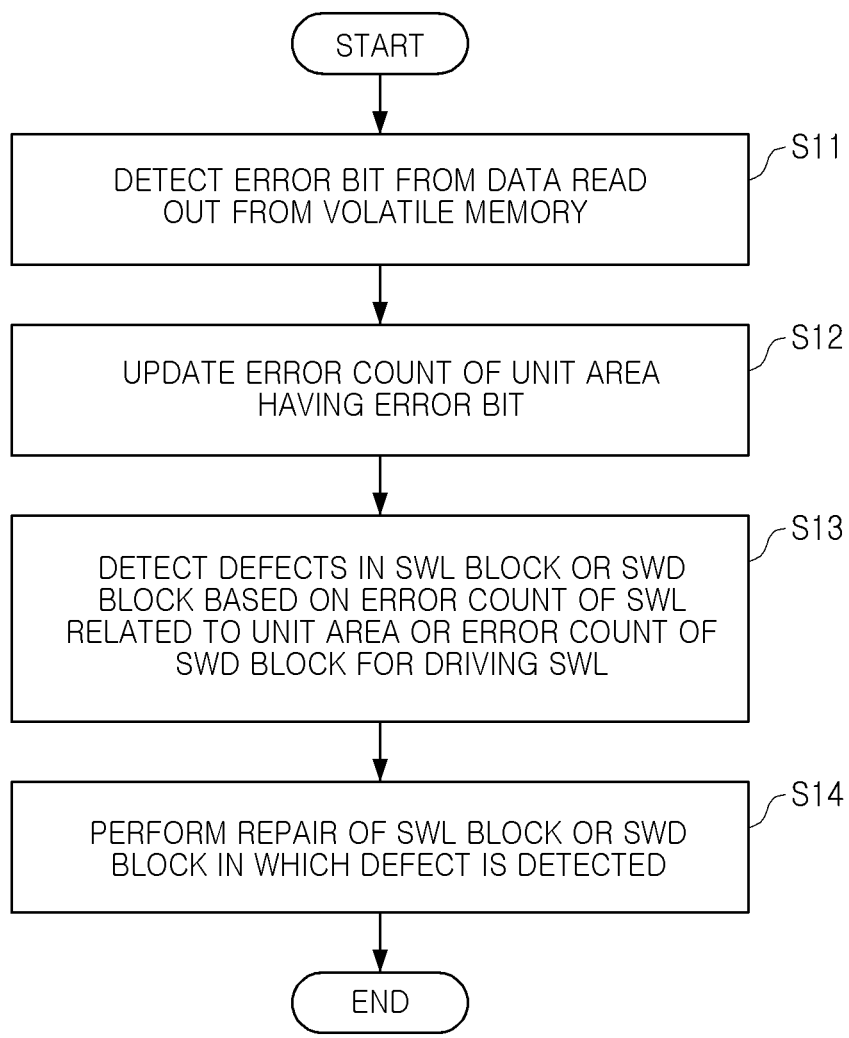
FIG. 4 is a flowchart illustrating a repair operation of a volatile memory according to an example embodiment of the present disclosure.

Hereinafter, an example of a method of controlling repair of the volatile memory 120 by the storage controller 110 will be described in greater detail with reference to FIG. 4, which is a flowchart illustrating a repair operation of a volatile memory according to an example embodiment. Referring to FIGS. 1 and 4, the storage controller 110 may detect an error bit from data read out from the volatile memory 120 in operation S11. For example, the storage controller 110 may include an error correction code (ECC) circuit, and the storage controller 110 may detect an error bit by performing ECC decoding on the read out data.

In operation S12, the storage controller 110 may update an error count of a unit area having the detected error bit. The unit area may have a size sufficient to identify a sub-wordline related to the unit area. For example, the unit area may correspond to memory cells connected to a sub-wordline in a sub-cell array. That is, the unit area may correspond to memory cells connected to the unit wordline described with reference to FIG. 3. In example embodiments, the unit area may be identified by a logical address allocated to the volatile memory 120. The storage controller 110 may, by referring to the structure map table 111, determine an error count of a sub-wordline related to the unit area and an error count of a sub-wordline driver block for driving the sub-wordline based on the updated error count of the unit area.

In operation S13, the storage controller 110 may detect defects in the sub-wordline SWL or the sub-wordline driver SWD blocks based on the error count of the sub-wordline SWL related to the unit area or the error count of the sub-wordline driver SWD block for driving the sub-wordline SWL. In operation S14, the storage controller 110 may perform repair of the sub-wordline SWL or the sub-wordline driver SWD block in which a defect is detected. For example, when a defect is detected in the sub-wordline SWL, the storage controller 110 may replace memory cells connected to the sub-wordline SWL with memory cells connected to the redundancy sub-wordline. When a defect is detected in the sub-wordline driver SWD block, the storage controller 110 may replace a sub-cell array related to the sub-wordline driver SWD block with a reserved sub-cell array.

The storage controller 110 may perform the repair in an idle state in which a request from the host 50 is not performed. When a request is received from the host 50 while the repair is being performed, the storage controller 110 may delay a response to the request. For example, in some embodiments, the storage controller 110 may detect a structural defect of the volatile memory 120 by performing an error count for each unit area, and may control repair of memory cells in an optimal range according to the defect detection result. For example, when a defect is detected in a sub-wordline, memory cells in a range smaller than a row may be replaced. Since the replacement range of memory cells may be reduced, waste of redundancy memory cells may be prevented. Also, when a defect is detected in the sub-wordline driver block, a wider range of memory cells subject to errors may be replaced, such that errors in the storage device 100 and system errors in the electronic system 100 may be prevented. Accordingly, a lifespan and reliability of the storage device 100 may be improved.

Figure 5:
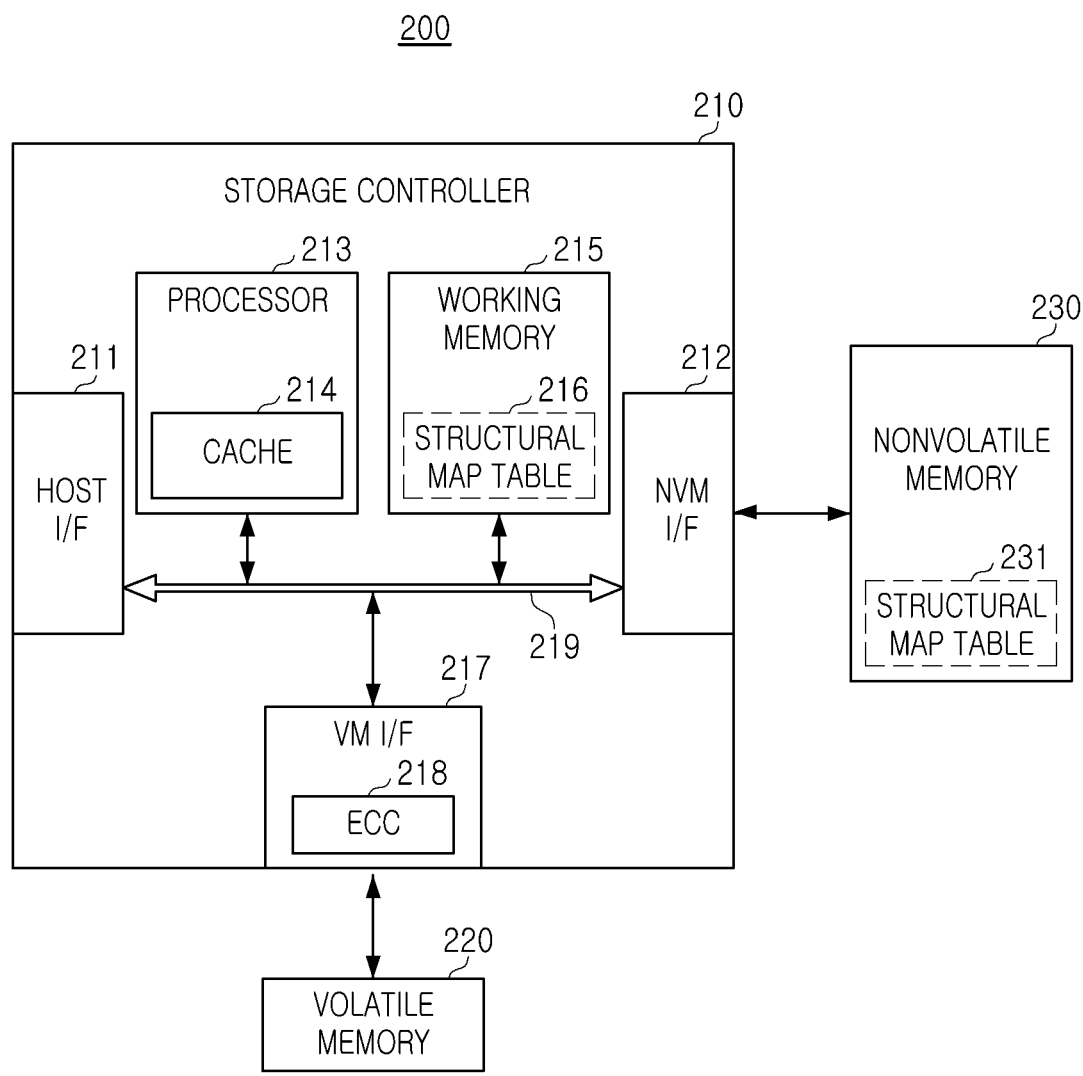
FIG. 5 is a diagram illustrating a storage device according to an example embodiment of the present disclosure.

Hereinafter, a storage device according to an example embodiment will be described in greater detail with reference to FIGS. 5 to 9, where FIG. 5 is a diagram illustrating a storage device 200 according to an example embodiment. This storage device may include at least one of an SSD, an embedded memory, and an external memory described with reference to FIG. 1.

Referring to FIG. 5, the storage device 200 may include a storage controller 210, a volatile memory 220 and a nonvolatile memory 230. The storage controller 210 and volatile memory 220 in FIG. 5 may correspond to the storage controller 110 and the volatile memory 120 described with reference to FIG. 1. The storage controller 210 may control the storage device 200. For example, the storage controller 210 may store data in the nonvolatile memory 230 in response to a request from the host or may provide data stored in the nonvolatile memory 230 to the host.

The volatile memory 220 may buffer data to be stored in the nonvolatile memory 230 or data to be provided to the host. The volatile memory 220 may further store a map table representing a mapping relationship between a logical address used in the host and a physical address of the nonvolatile memory 230. The volatile memory 220 having high capacity may be employed in the storage device 200 in response to the demand for high capacity and high speed of the storage device 200.

As described with reference to FIGS. 2 and 3, the volatile memory 220 may include a memory cell array including a plurality of sub-cell arrays and peripheral circuits. In example embodiments, the volatile memory 220 may include a plurality of memory banks each including a memory cell array and peripheral circuits.

The nonvolatile memory 230 may be a memory which may maintain stored data even when the storage device 200 is turned off, and may include, for example, a flash memory. When the nonvolatile memory 230 may include a flash memory, the flash memory may include a 2D NAND memory array or a 3D (or vertical) NAND (VNAND) memory array. As another example, the storage device 200 may include other various types of nonvolatile memories. For example, a magnetic RAM (MRAM), spin-transfer torque MRAM (MRAM), conductive bridging RAM (CBRAM), ferroelectric RAM (FeRAM), phase RAM (PRAM), and resistive memory (Resistive RAM) and other various types of memory may be applied to the storage device 200.

The storage controller 210 may include a host interface 211, a nonvolatile memory interface 212, a processor 213, a working memory 215 and a volatile memory interface 217. Also, the storage controller 210 may include a bus 219 supporting communication between a host interface 211, a nonvolatile memory interface 212, a processor 213, a working memory 215 and a volatile memory interface 217. In example embodiments, the host interface 211, the nonvolatile memory interface 212, the processor 213, the working memory 215, the volatile memory interface 217 and the bus 219 of the storage controller 210 may be integrated as a system-on-chip (SoC).

The host interface 211 may transmit a packet to and receive a packet from the host. A packet transmitted from the host to the host interface 211 may include a command or data to be recorded in the nonvolatile memory 230, and a packet transmitted from the host interface 211 to the host may include a response to a command or data read out from the nonvolatile memory 230. The host interface 211 may transmit a packet to and receive a packet from the host in accordance with the NVMe standard, UFS standard, or eMMC standard.

The nonvolatile memory interface 212 may transmit data to be stored in the nonvolatile memory 230 to the nonvolatile memory 230 or may receive data output from the nonvolatile memory 230. The nonvolatile memory interface 212 may be implemented to comply with standard protocols such as toggle or open NAND flash interface (ONFI).

The processor 213 may control the overall operations of the storage controller 210. For example, the processor 213 may drive a flash translation layer (FTL). The flash translation layer may be configured to perform multiple functions such as address mapping, wear-leveling, and garbage collection. The address mapping operation may be of converting a logical address received from the host into a physical address used to actually store data in the nonvolatile memory 230. The wear-leveling may be a technique for preventing excessive deterioration of a specific block by uniformly using blocks in the nonvolatile memory 230, and may be implemented through firmware technique for balancing erase counts of physical blocks, for example. The garbage collection may be a technique for securing usable capacity in the nonvolatile memory 230 by copying valid data of a block to a new block and erasing an existing block.

The processor 213 may refer to data stored in the volatile memory 220 to perform various functions. The processor 213 may include a cache memory 214 and may access data stored in the volatile memory 220 through the cache memory 214. For example, the processor 213 may search for data to be referenced in the cache memory 214, may load the data from the volatile memory 220 when the data to be referred to is not cached in the cache memory 214, and may cache the loaded data in the cache memory 214.

The working memory 215 may store data necessary for operation of the processor 213. For example, firmware of a flash translation layer driven by the processor 213 may be loaded to the working memory 215. In some example embodiments, the working memory 215 may include a static random access memory (SRAM), and may further store a structure map table 216 representing a mapping relationship between a unit area of the volatile memory 220, a sub-wordline, and a sub-wordline driver block.

The volatile memory interface 217 may transmit data to be stored in the volatile memory 220 to the volatile memory 220 or may receive data output from the volatile memory 220. The volatile memory interface 217 may also be referred to as a memory controller.

The volatile memory interface 217 may include an ECC circuit 218. The ECC circuit 218 may add a parity by performing ECC encoding on data to be stored in the volatile memory 220, or may detect error bits of data by performing ECC decoding on data received from the volatile memory 220 and may correct the error bits. FIG. 5 illustrates the example in which the volatile memory interface 217 may include the ECC circuit 218, but an example embodiment thereof is not limited thereto, and the volatile memory 220 may include an on-die ECC circuit.

The correction capability of the ECC circuit 218 may be limited. When the data received from the volatile memory 220 may include the number of error bits exceeding correction capability of the ECC circuit 218, the ECC circuit 218 may not correct the received data. An error which may occur in received data may be referred to as a correctable error (CE) or an uncorrectable error (UE) depending on whether the error may be corrected by the ECC circuit 218.

In an example embodiment, when an error which may be corrected is detected by the volatile memory interface 217, the processor 213 may update the error count of the unit area including error bits to the structure map table 216. The processor 213 may refer to the structure map table 216 to detect structural defects of the volatile memory 220 and may replace memory cells in a selected range based on the detected defects.

In an example embodiment, the storage device 200 may replace memory cells based on structural defects of the volatile memory 220 and may avoid the use of defective elements, thereby correcting uncorrectable errors which may occur as structural defects intensify. The storage device 200 may prevent failure of an electronic system including the storage device 200 by preventing uncorrectable errors from occurring.

Also, the processor 213 may store the structure map table 216 stored in the working memory 215 in the nonvolatile memory 230 when powering off the storage device 200, so that even after the storage device 200 is powered off, an error count for each unit area may be preserved. FIG. 5 illustrates a structure map table 231 stored in the nonvolatile memory 230; upon startup, the structure map table 231 may be loaded to the working memory 215 (e.g., when the storage device 200 is booted).

Hereinafter, an example of the structure map table 216 according to example embodiment will be described in greater detail with reference to FIG. 6, which is a diagram illustrating a structure map table stored in a storage device according to an example embodiment. The structure map table 216 illustrated in FIG. 6 may correspond to the structure map table 216 described with reference to FIG. 5. The structure map table 216 may include a logical address Logical ADDR, a sub-wordline driver block index SWDB Index, a sub-wordline index SWL Index, and an error count Error Count.

The logical address may refer to a system address allocated to the volatile memory 220 such that the processor 213 may access the volatile memory 220. For example, consecutive logical addresses may be allocated to the memory space of the volatile memory 220, and the processor 213 may access the memory space of the volatile memory 220 using the logical addresses. In some embodiments, the logical addresses of the structure map table 216 may be identifiers indicating a plurality of unit areas included in the volatile memory 220. For example, the memory space of the volatile memory 200 may be partitioned into a plurality of unit areas based on the logical addresses. As described above, a plurality of unit areas may correspond to memory cells connected to a unit wordline.

The logical addresses in FIG. 6 may represent representative addresses among logical addresses corresponding to the unit area. For example, a portion of the unit areas may correspond to logical addresses of "0x00_0000" to "0x00_007F," and "0x00_007F" of the structure map table 216 may function as an identifier indicating the unit areas. In the example in FIG. 6, a unit area may have a size of "0x80," that is, 128 bits. However, the number of memory cells connected to a unit wordline may vary in example embodiments, and a unit area may have various sizes in example embodiments.

The SWDB index and the SWL index of the structure map table 216 may indicate an identifier of a sub-wordline driver block and an identifier of a sub-wordline related to each unit area represented by logical addresses. Referring to FIGS. 3 and 6 together, a unit area of memory cells connected to a first sub-wordline SWL1 in a first sub-cell array SCA1 may be identified as a logical address "0x00_007F." The unit area may be related to a first sub-wordline SWL1, and may be related to a first sub-wordline driver block SWDB1 including a sub-wordline driver driving the first sub-wordline SWL1.

Also, the unit area of memory cells connected to the second sub-wordline SWL2 in the second sub-cell array SCA2 may be identified as a logical address "0x00_00FF." The unit area may be related to a second sub-wordline SWL2 and may be related to a third sub-wordline driver block SWDB3 including a sub-wordline driver driving the second sub-wordline SWL2. Similarly, the unit area of memory cells connected to the second sub-wordline SWL2 in the third sub-cell array SCA3 may be identified as the logical address "0x00_017F." The unit area may be related to a second sub-wordline SWL2 and a third sub-wordline driver block SWDB3.

In relation to the structure map table 216 in FIG. 6, the mapping between unit areas identified as logical addresses, the sub-wordline driver blocks SWDB1-SWDB5 and sub-wordlines SWL1-SWL8 are illustrated with the memory cell array MCA illustrated in FIG. 3 as an example. For reference, rows ROW1-ROW3 including unit areas in FIG. 6 are illustrated. An error count of the structure map table 216 in FIG. 6 indicates an error count for each unit area represented by logical addresses. Even when the storage controller 210 reads out data of the volatile memory 220 in units of rows, the ECC circuit 218 may specify a position of the error bit included in the row, such that the storage controller 210 may advantageously update the error count for each unit area smaller than the row. For example, the error count of each unit area represented by logical addresses "0x00_007F," "0x00_00FF," "0x00_017F," "0x00_01FF" may be updated in a separated manner based on the error occurring when reading out the first row ROW1.

In an example embodiment, the storage controller 210 may detect structural defects of the volatile memory 220 based on an error count for each unit area. As a first example, the storage controller 210 may determine an error count of the second sub-wordline SWL2 by summing error counts X and Y of unit areas corresponding to logical addresses "0x00_007F" and "0x00_00FF." When the error count of the second sub-wordline SWL2 exceeds a threshold, the storage controller 210 may determine that the second sub-wordline SWL2 has a defect.

As a second example, the storage controller 210 may determine the error count of the fifth sub-wordline driver block SWDB5 by summing error counts Z and W of unit areas corresponding to logical addresses "0x00_01FF" and "0x00_05FF." When the error count of the fifth sub-wordline driver block SWDB5 exceeds a threshold, the storage controller 210 may determine that the fifth sub-wordline driver block SWDB5 has a defect. Advantageously, a threshold for determining whether a sub-wordline has a defect and a threshold for determining whether a sub-wordline driver block has a defect may be independently determined and may have different values in some embodiments.

In an example embodiment, the storage controller 210 may control repair of memory cells in different ranges depending on whether there is a defect in a sub-wordline or a defect in a sub-wordline driver block. Hereinafter, a first repair operation for repairing a defect in a sub-wordline is described with reference to FIG. 7, and a second repair operation for repairing a defect in a sub-wordline driver block is described with reference to FIGS. 8 and 9. In particular, FIG. 7 illustrates a first repair operation of performing repair of a sub-wordline when a defect is detected in the sub-wordline.

Similarly to the volatile memory 120 described with reference to FIG. 2, the volatile memory 220 in FIG. 7 may include a memory cell array and peripheral circuits. FIG. 7 illustrates sub-cell arrays SCA1 and SCA2 which may be included in the memory cell array of the volatile memory 220, and sub-wordline driver blocks SWDB1, SWDB2, and SWDB3 and a control logic circuit 226 which may be included in peripheral circuits. In FIG. 7, other components which may be included in the volatile memory 220 are not provided.

Figure 7:
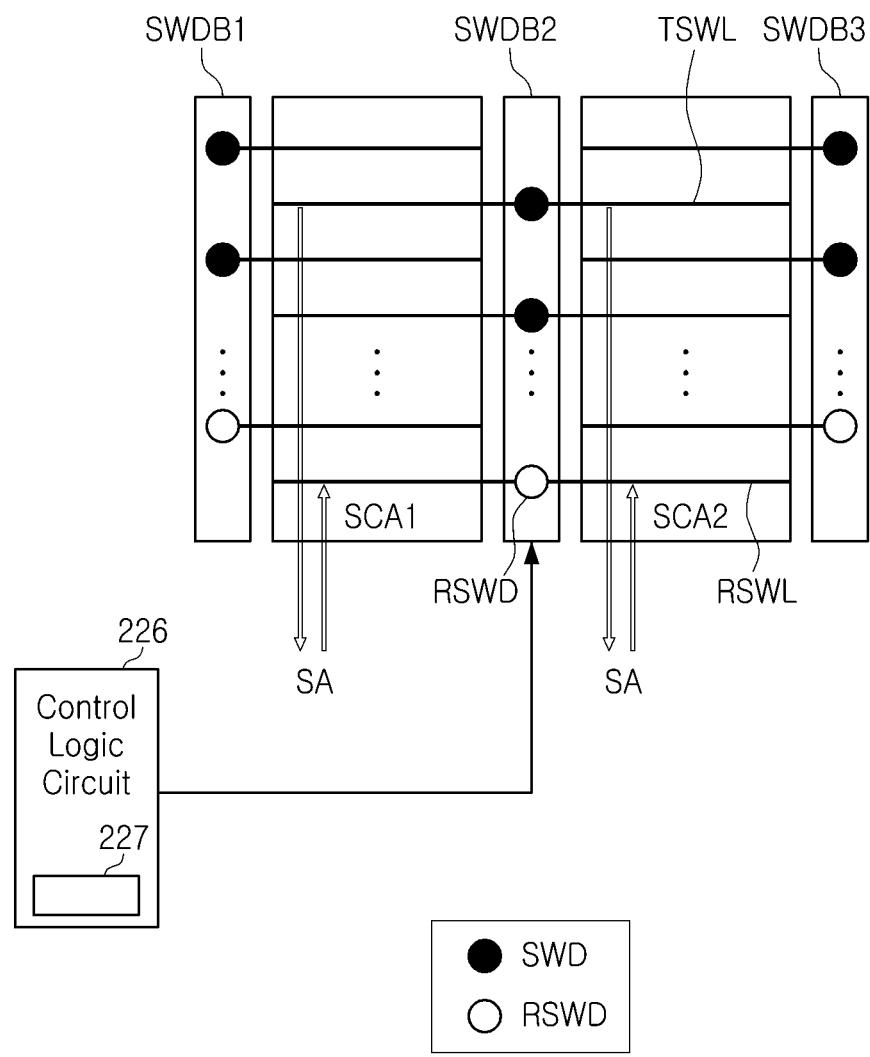
FIG. 7 is a diagram illustrating a first repair operation for a volatile memory according to an example embodiment of the present disclosure.

In FIG. 7, a first repair operation is illustrated with an example of using a redundancy sub-wordline RSWL to repair a defect of a target sub-wordline TSWL. The first repair operation may be referred to as PPR and may be performed in response to a PPR command from the storage controller 210. The sub-cell arrays SCA1 and SCA2 may include normal memory cells and redundancy memory cells. Each of the sub-wordline driver blocks SWDB1, SWDB2, and SWDB3 may include a normal sub-wordline driver SWD and a redundancy sub-wordline driver RSWD. A normal sub-wordline driver SWD may drive a normal sub-wordline, and a redundancy sub-wordline driver RSWD may drive a redundancy sub-wordline RSWL. A normal sub-wordline may be connected to normal memory cells, and a redundancy sub-wordline may be connected to redundancy memory cells.

Redundancy memory cells may replace the normal memory cells when the normal memory cells have a defect. For example, data stored in defective normal memory cells may be moved to the redundancy memory cells. Instead of the defective normal memory cells, the redundancy memory cells may be accessed. The target sub-wordline TSWL may be driven by a sub-wordline driver SWD included in a second sub-wordline driver block SWDB2. The control logic circuit 226 may output data stored in memory cells connected to the target sub-wordline TSWL to the sense amplifier SA as described with reference to FIG. 2 by controlling the sub-wordline driver SWD. The control logic circuit 226 may store data output to the sense amplifier SA in redundancy memory cells included in the redundancy sub-wordline RSWL by controlling the redundancy sub-wordline driver RSWD.

The data output to the sense amplifier SA may include an error bit, and data including the error bit may be copied as is to the redundancy memory cells. When the error bit of the copied data is output to the storage controller 210 in response to a request of the storage controller 210, the error bit may be corrected by the ECC circuit 218.

The control logic circuit 226 may remap a physical address of the target sub-wordline TSWL to a physical address of the redundancy sub-wordline RSWL in the nonvolatile memory 227, thereby avoiding the access to the target sub-wordline TSWL. For example, the control logic circuit 226 may include a nonvolatile memory 227 having fuses pointing to each of the sub-wordlines. The control logic circuit 226 may program the physical address of the target sub-wordline TSWL by blowing a fuse corresponding to the target sub-wordline TSWL in the nonvolatile memory 227. When the physical address of the target sub-wordline TSWL is input, the control logic circuit 226 may control the second sub-wordline driver block SWDB2 such that the redundancy sub-wordline RSWL is driven instead of the target sub-wordline TSWL.

In other words, the storage controller 210 may, by providing a PPR command for the defective sub-wordline, perform a first repair operation of controlling the volatile memory 220 to remap the physical address of the defective sub-wordline to the physical address of the redundancy sub-wordline.

Figure 8:
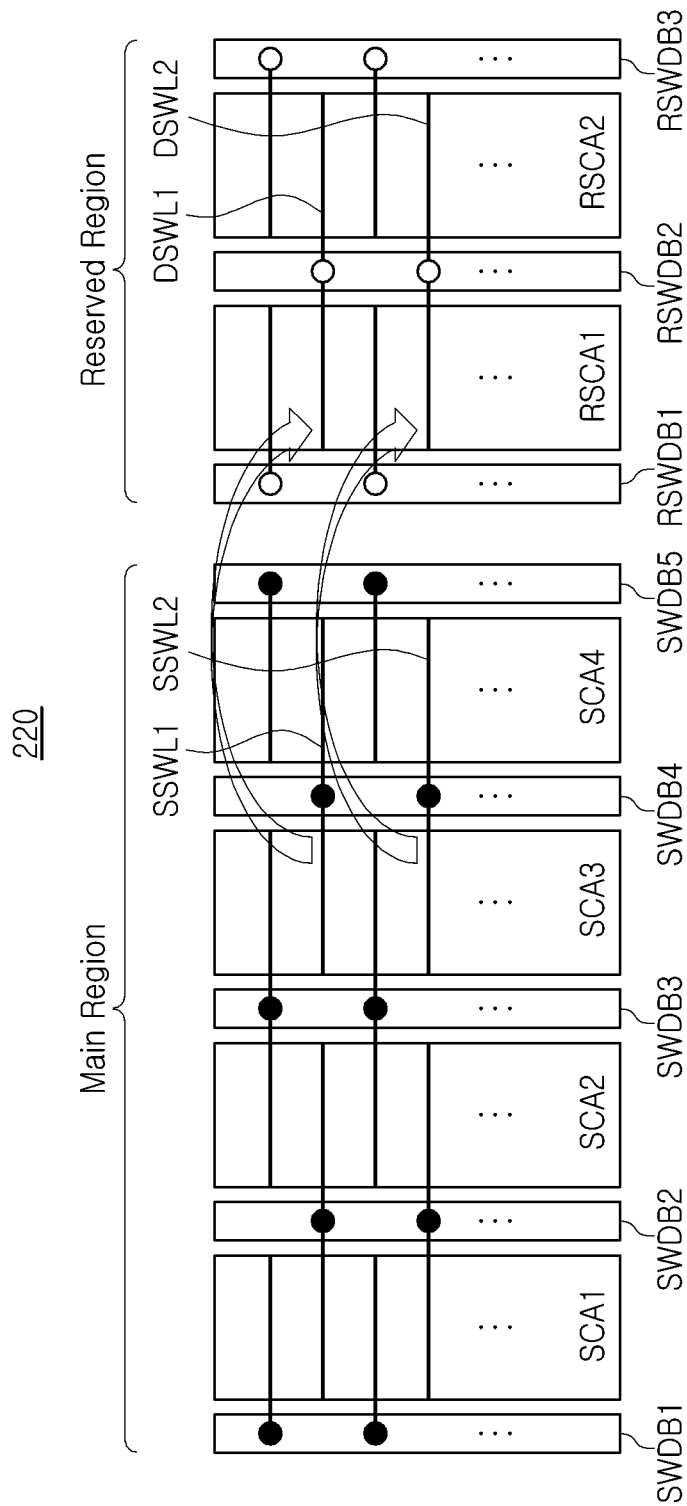
FIGS. 8 and 9 are diagrams illustrating a second repair operation for a volatile memory according to an example embodiment of the present disclosure.
Figure 9:
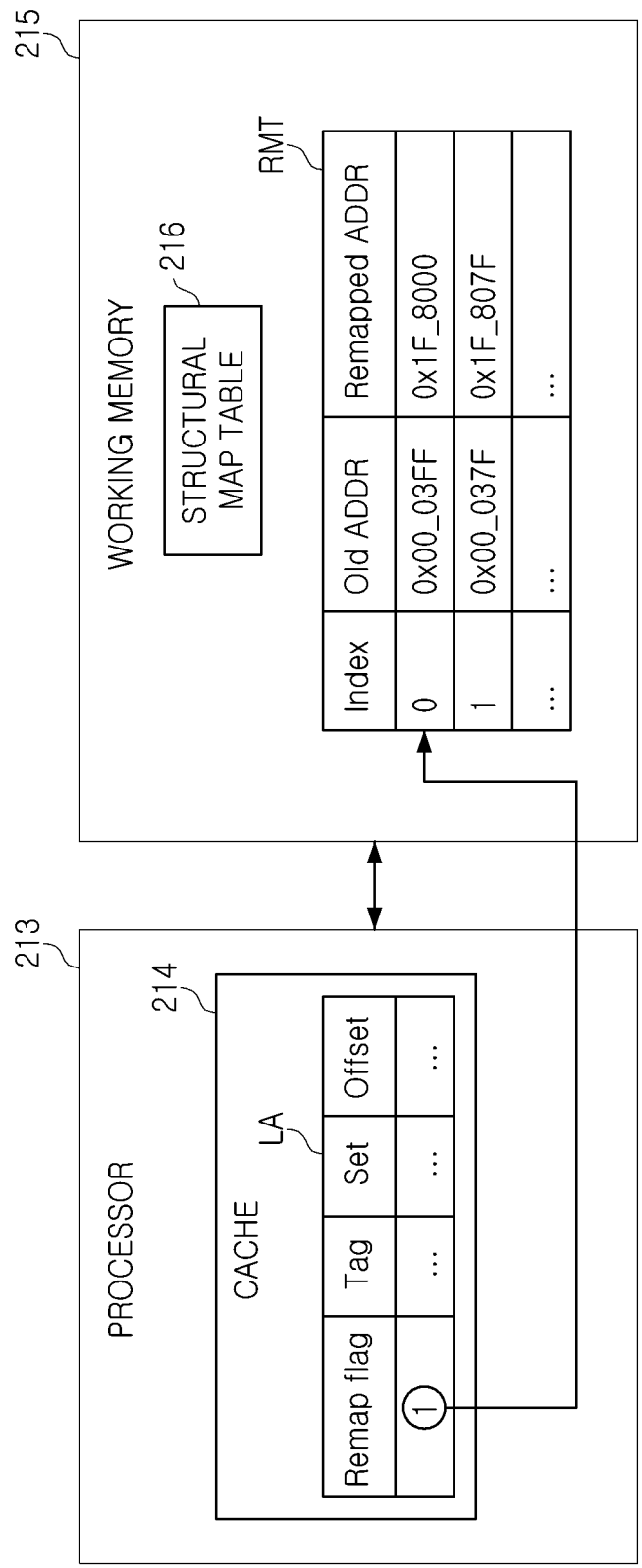

FIGS. 8 and 9 are diagrams illustrating a second repair operation for volatile memory according to an example embodiment. Specifically, FIG. 8 illustrates an operation of moving data of memory cell arrays in response to a defect detection of a sub-wordline driver block, and FIG. 9 illustrates an operation of remapping an address after data is moved.

Referring to FIG. 8, the volatile memory 220 may include a main region and a reserved region. The main region may include a plurality of sub-cell arrays SCA1-SCA4 and a plurality of sub-wordline driver blocks SWDB1-SWDB5. A reserved region may include a plurality of reserved sub-cell arrays RSCA1 and RSCA2 and a plurality of reserved sub-wordline driver blocks RSWDB1-RSWDB3. The main region and the reserved region may be included in a memory cell array. When the volatile memory 220 includes a plurality of memory cell arrays, the main region and the reserved region may be included in different memory cell arrays.

FIG. 8 illustrates a second repair operation with the example in which a defect is detected in the fourth sub-wordline driver block SWDB4, and memory cells related to the fourth sub-wordline driver block SWDB4 are replaced with memory cells related to the second reserved sub-wordline driver block RSWDB2 of the reserved region. Referring to FIG. 8, a fourth sub-wordline driver block SWDB4 may be connected to sub-wordlines across third and fourth sub-cell arrays SCA3 and SCA4. The sub-wordlines may be referred to as source sub-wordlines, and in FIG. 8, first and second source sub-wordlines SSWL1 and SSWL2 among source sub-wordlines are illustrated.

A second reserved sub-wordline driver block RSWDB2 may be connected to sub-wordlines disposed throughout the first and second reserved sub-cell arrays RSCA1 and RSCA2. The sub-wordlines may be referred to as destination sub-wordlines, and in FIG. 8, first and second destination sub-wordlines DSWL1 and DSWL2 among the destination sub-wordlines are illustrated.

The storage controller 210 described with reference to FIG. 5 may control the volatile memory 220 to move data of the entirety of memory cells related to the fourth sub-wordline driver block SWDB4 to the reserved region in response to detection of a defect of the fourth sub-wordline driver block SWDB4.

Specifically, the storage controller 210 may generate error-corrected data by obtaining data of memory cells connected to source sub-wordlines and performing ECC decoding on the obtained data. The storage controller 210 may control the volatile memory 220 to store the error-corrected data in memory cells connected to destination sub-wordlines.

The storage controller 210 may store mapping information between source unit areas provided by memory cells related to a defective sub-wordline driver and destination unit areas provided by memory cells related to a selected reserved sub-wordline driver. The storage controller 210 may avoid access to the source unit areas by converting a logical address corresponding to the source unit areas into a logical address corresponding to the destination unit areas.

FIG. 9 illustrates the processor 213 and the working memory 215 described with reference to FIG. 5. The processor 213 may include a cache memory 214, and the working memory 215 may store a structure map table 216. In an example embodiment, the working memory 215 may further store a remapping table RMT for remapping source unit areas of the second repair operation to destination unit areas. The remapping table RMT may include old addresses Old ADDR representing source unit areas and remapped addresses Remapped ADDR representing destination unit areas. Both the old addresses and the remapped addresses may include logical addresses allocated to the volatile memory 220.

The processor 213 may access the volatile memory 220 through the cache memory 214. For example, the cache memory 214 may include cache lines, which are a plurality of storage spaces. Each of the cache lines may include a tag region and a data region. A logical address may include a plurality of bits, and the plurality of bits may include a tag, a set, and an offset. The processor 213 may determine whether data corresponding to the logical address is cached in the cache line by comparing the tag of the logical address with the tag of the tag region. When the data is cached in a cache line, the processor 213 may obtain data by accessing a data region corresponding to the tag region using a set and an offset.

In an example embodiment, the logical address field LA for accessing the cache memory 214 may further include a remap flag in addition to a tag, a set, and an offset. A remap flag may indicate whether an address indicated by a tag, set and offset, has been remapped by the second repair operation. When the remap flag of the logical address to be accessed is set, and when the value of the remap flag is "1," the processor 213 may convert the logical address into a remapped address by sequentially searching for an index of the remapping table RMT of the working memory 215, and may access the cache memory 214 based on a remapped address. Then, it may be determined whether data to be accessed is cached by comparing a tag included in the remapped address with a tag stored in a cache line of the cache memory 214.

In an example embodiment, the storage controller 210 may control the volatile memory 220 to detect a defective sub-wordline driver block, and to replace source sub-wordlines driven by the sub-wordline driver with destination sub-wordlines driven by a reserved sub-wordline driver. The storage controller 210 may effectively process a large amount of address remapping using a remapping table RMT indicating mapping between source unit areas and destination unit areas.

In FIGS. 5 to 9, the example embodiment in which the storage device 200 is implemented as an SSD, an embedded memory, and an external memory including the nonvolatile memory 230 provided externally of the storage controller 210. Hereinafter, an example embodiment in which the storage device is implemented as a CXL expansion memory will be described with reference to FIGS. 10 to 12.

Figure 10:
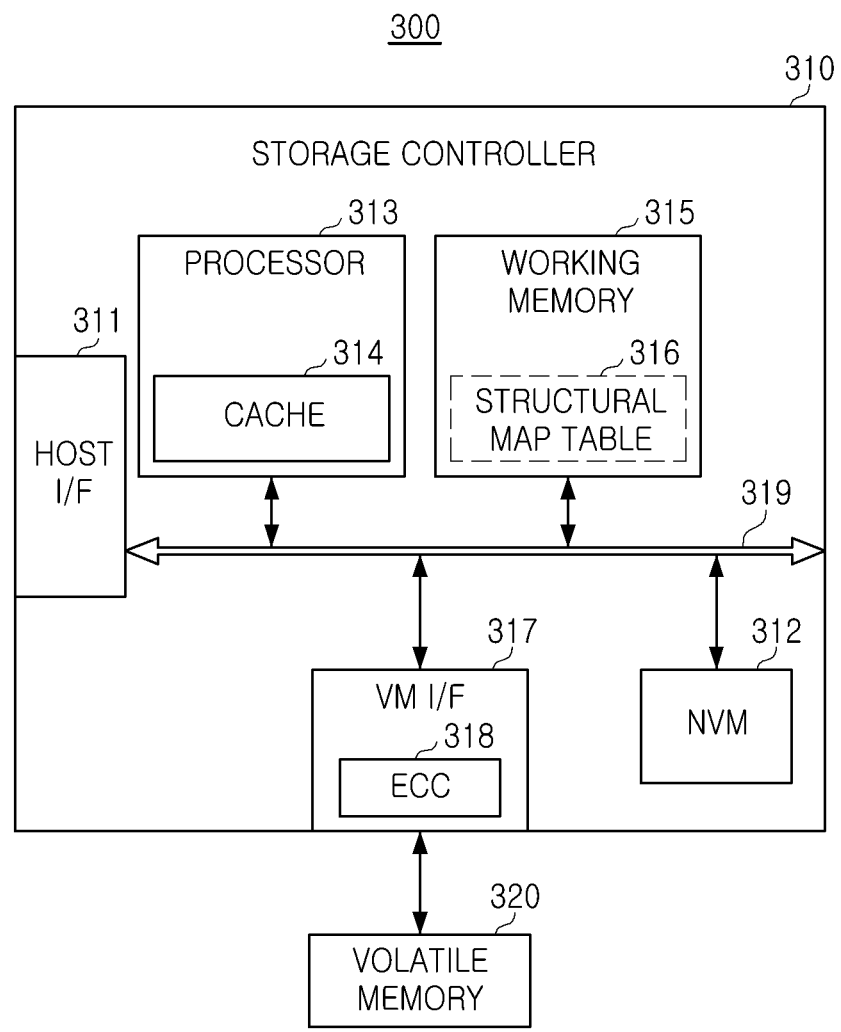
FIG. 10 is a diagram illustrating a storage device according to an example embodiment of the present disclosure.

FIG. 10 is a diagram illustrating a storage device 300 according to an example embodiment, which may include a storage controller 310 and a volatile memory 320. The storage controller 310 and the volatile memory 320 may correspond to the storage controller 110 and the volatile memory 120 described with reference to FIG. 1. In some embodiments, the storage device 300 may be implemented as a CXL expansion memory, and a volatile memory 320 having high capacity may be employed to provide an extended memory space to a host.

The storage controller 310 in FIG. 10 may include a host interface 311, a nonvolatile memory 312, a processor 313, a working memory 315 and a volatile memory interface 317. The storage controller 310 may further include a bus 319 supporting communication between the host interface 311, the nonvolatile memory 312, the processor 313, the working memory 315 and the volatile memory interface 317.

The processor 313 may include a cache memory 314, and the volatile memory interface 317 may include an ECC circuit 318. The working memory 315 may store the structure map table 316. The host interface 311 may transmit/receive packets with a host similarly to the example described with reference to FIG. 5. For example, the host interface 311 may transmit and receive packets in compliance with the CXL standard.

The nonvolatile memory 312 may store data to be preserved even when the storage device 300 is powered off. The nonvolatile memory 312 may be referred to when booting the storage device 300. The processor 313 may control overall operations of the storage controller 310. The processor 313 may include a cache memory 314 and may access data stored in the volatile memory 320 through the cache memory 314.

The working memory 315 may store data necessary for operation of the processor 313. For example, firmware of a flash translation layer driven by the processor 313 may be loaded to the working memory 315. In example embodiments, the working memory 315 may include a static random access memory (SRAM). According to an example embodiment, the working memory 315 may store a structure map table 316 such as the structure map table 216 described with reference to FIG. 6.

The volatile memory interface 317 may transmit data to be stored in the volatile memory 320 to the volatile memory 320 or may receive data output from the volatile memory 320. The volatile memory interface 317 may include an ECC circuit 318.

According to the example embodiment, when an error bit is detected in data read out from the volatile memory 320 by the ECC circuit 318, the processor 313 may perform an error count of the unit area including the error bit. The processor 313 may update the error count for each unit area to the structure map table 316.

The processor 313 may determine an error count for each sub-wordline and an error count for each sub-wordline driver block based on the error count for each unit area with reference to the structure map table 316. When the error count of a sub-wordline exceeds a predetermined threshold, the processor 313 may control the volatile memory 320 to perform a first repair operation of replacing the sub-wordline with a redundancy wordline.

When the error count of the sub-wordline driver block exceeds a predetermined threshold, the processor 313 may control the volatile memory 320 to perform a second repair operation of replacing wordlines driven by the sub-wordline driver block with reserved wordlines. The working memory 315 may further store a remapping table indicating a mapping relationship between previous addresses and remapped addresses for source unit areas and destination unit areas replaced by the second repair operation.

The processor 313 may access the memory space of the volatile memory 320 using a logical address allocated to the volatile memory 320. In an example embodiment, the logical address may include a remap flag indicating whether the logical address has been remapped by the second repair operation. When the remap flag of the logical address is set, the processor 313 may convert the logical address into a remapped logical address by referring to the remapping table stored in the working memory 315, and may access the volatile memory 320 using the remapped logical address.

The processor 313 may store the structure map table 316 and the remapping table in the nonvolatile memory 312 when the storage device 300 is powered off. The processor 313 may load the structure map table 316 and the remapping table to the working memory 315 when the storage device 300 boots. Accordingly, structural defect information and remap information of the volatile memory 320 may be maintained even when the storage device 300 is powered off.

A storage device in the example embodiment may include volatile memories having different physical structures. Hereinafter, a storage device including volatile memories having different physical structures will be described as an example with reference to FIGS. 11 and 12.

Figure 11:
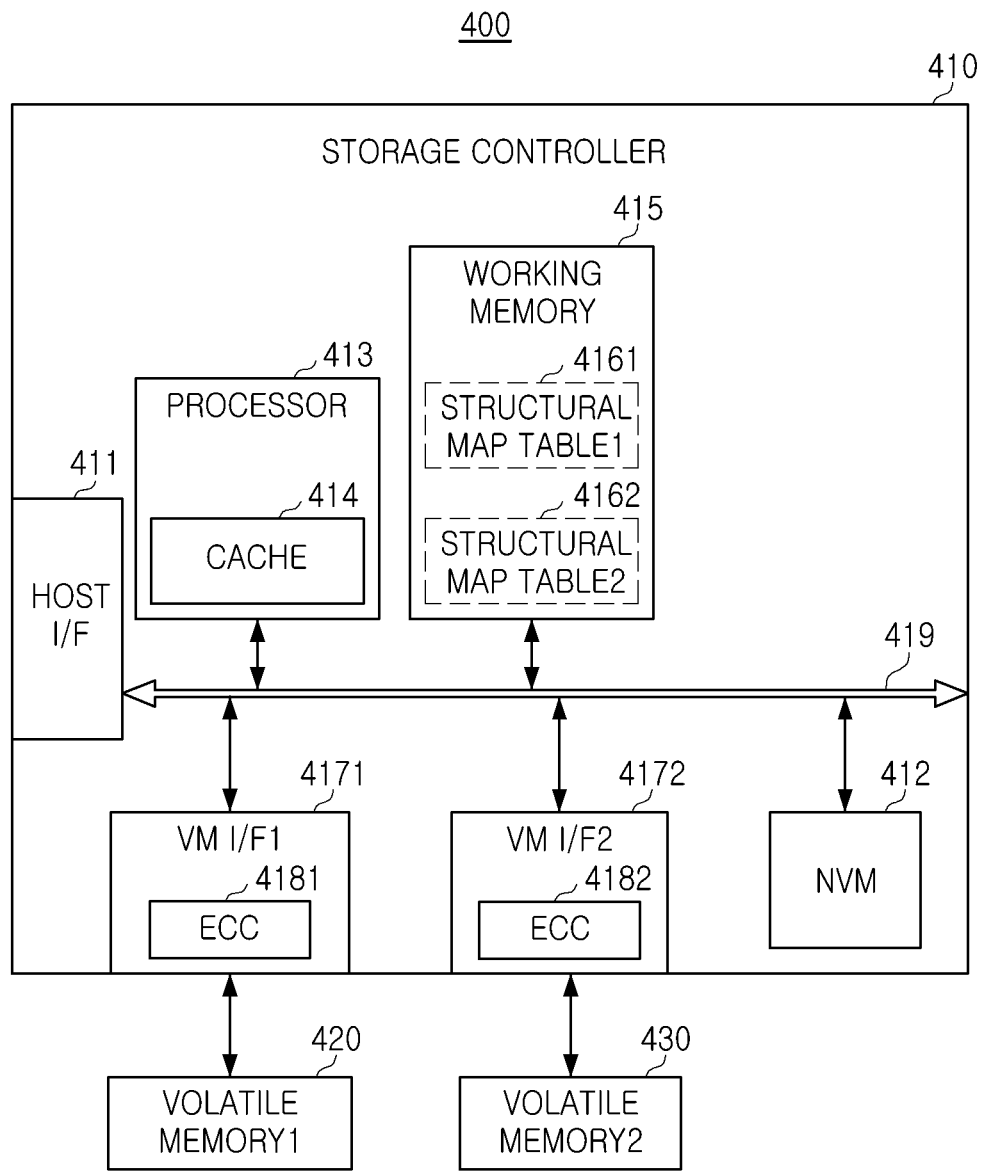
FIG. 11 is a diagram illustrating a storage device according to an example embodiment of the present disclosure.

In particular, FIG. 11 is a diagram illustrating a storage device 400 according to an example embodiment, which may include a storage controller 410, a first volatile memory 420 and a second volatile memory 430. The storage device 400 may be implemented as a CXL expansion memory and may include components similar to those of the storage device 300 described with reference to FIG. 10. Hereinafter, the storage device 400 in FIG. 11 will be described in greater detail, focusing on differences from the storage device 300 in FIG. 10.

The first and second volatile memories 420 and 430 may have different physical structures. As a first example, a connection structure between sub-cell arrays and sub-wordline driver blocks may be different in the first and second volatile memories 420 and 430. Also, the number of memory cells connected to a unit wordline in a sub-cell array may be different in the first and second volatile memories 420 and 430.

The first volatile memory 420 may be implemented as a double data rate (DDR) DRAM, and the second volatile memory 430 may be implemented as a low power double data rate (LPDDR) DRAM. Alternatively, the first volatile memory 420 and the second volatile memory 430 may be DDR DRAMs of different generations or LPDDR DRAMs of different generations.

The storage device 400 may include a first volatile memory interface 4171 for controlling the first volatile memory 420 and a second volatile memory interface 4172 for controlling the second volatile memory 430. The first volatile memory interface 4171 and the second volatile memory interface 4172 may include a first ECC circuit 4181 and a second ECC circuit 4182, respectively.

In an example embodiment, the working memory 415 may independently store a first structure map table 4161 representing the relationship between the unit area of the first volatile memory 420, a sub-wordline, and a sub-wordline driver and a second structure map table (4162) representing the relationship between the unit area of the second volatile memory (430), a sub-wordline, and a sub-wordline driver.

Figure 12:
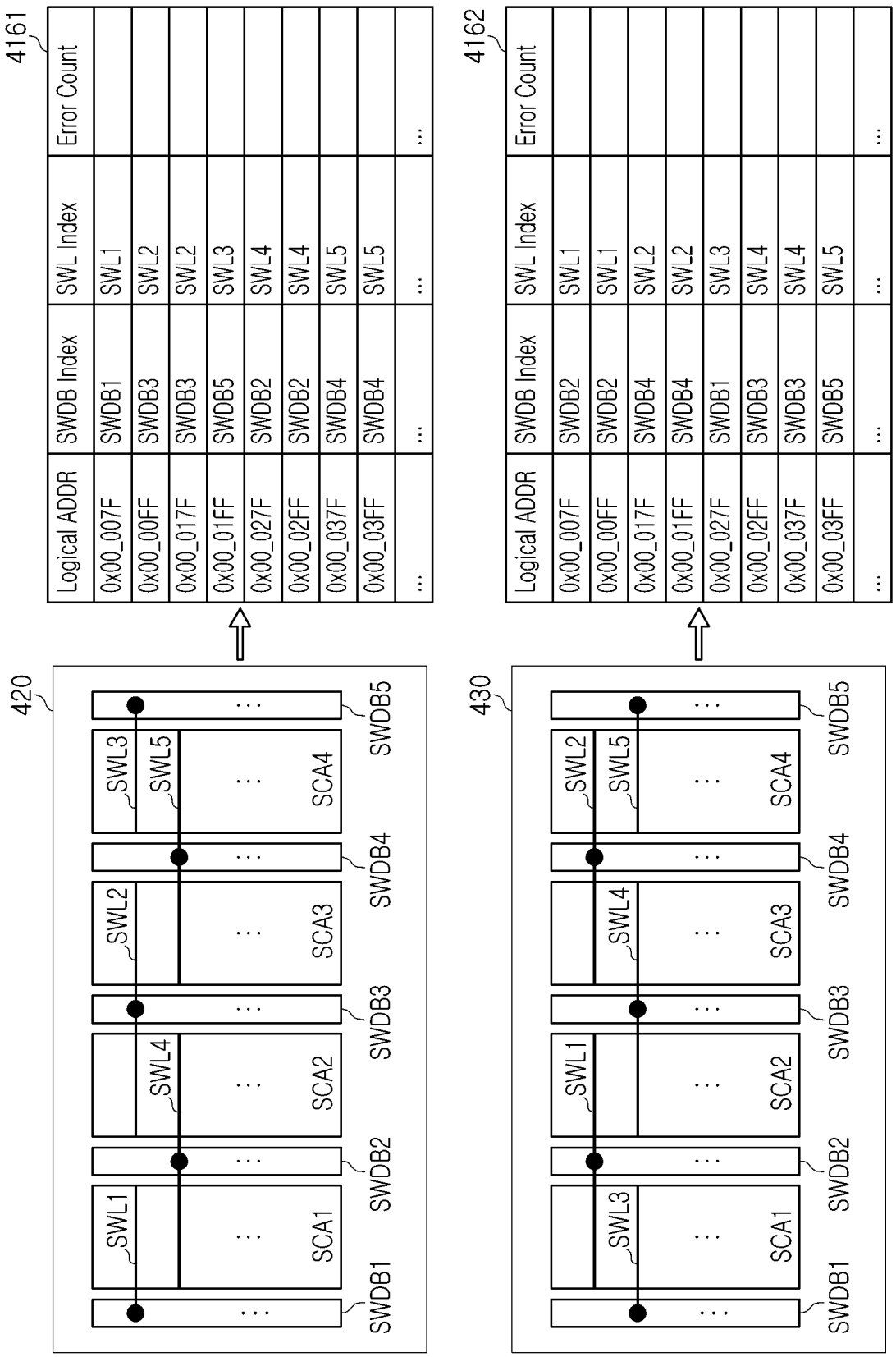
FIG. 12 is a structure map table stored in a storage device according to an example embodiment of the present disclosure.

FIG. 12 is a structure map table stored in a storage device according to an example embodiment. FIG. 12 illustrates first and second volatile memories 420 and 430 and first and second structure map tables 4161 and 4162, which may be included in the storage device 400 described with reference to FIG. 11. Referring to FIG. 12, the first and second volatile memories 420 and 430 may have different physical structures. In the first volatile memory 420, sub-wordlines related to odd-numbered rows, for example, first to third sub-wordlines SWL1-SWL3 may be driven by odd-numbered sub-wordline driver blocks SWDB1, SWDB3, and SWDB5. Sub-wordlines related to even-numbered rows, for example, fourth and fifth sub-wordlines SWL4 and SWL5 may be driven by even-numbered wordline driver blocks SWDB2 and SWDB4.

Differently from the first volatile memory 420, in the second volatile memory 430, sub-wordlines related to odd-numbered rows, for example, first and second sub-wordlines SWL1 and SWL2 may be driven by even-numbered sub-wordline driver blocks SWDB2 and SWDB4. Sub-wordlines related to even-numbered rows, for example, third to fifth sub-wordlines SWL3-SWL5 may be driven by odd-numbered sub-wordline driver blocks SWDB1, SWDB3, SWDB5.

Since the first and second volatile memories 420 and 430 have different physical structures, the unit areas corresponding to the same logical address in each of the first and second volatile memories 420 and 430 may be related to different sub-wordlines and different sub-wordline driver blocks. Also, the sizes of the unit areas of the first and second volatile memories 420 and 430 may be different.

Accordingly, the storage device 400 may independently manage the structure map table 4161 of the first volatile memory 420 and the structure map table 4162 of the second volatile memory 430. According to the example embodiment, even when the storage device 400 includes the first and second volatile memories 420 and 430 having different physical structures, structural defects of each of the first and second volatile memories 420 and 430 may be detected using the first and second structure map tables 4161 and 4162, and memory cells in an optimal range may be repaired based on the detected defects.

According to the aforementioned example embodiments, the storage device including volatile memory may perform an error count for each unit area of the volatile memory and may detect a defect occurring in a sub-wordline or a sub-wordline driver based on the error count. Also, the storage device including a volatile memory may vary a repair performance range depending on whether a defect in the volatile memory occurs in a sub-wordline or a sub-wordline driver block, thereby effectively preventing system errors caused by defects.

While the example embodiments have been illustrated and described above, it will be configured as apparent to those skilled in the art that modifications and variations could be made without departing from the scope of the present disclosure as defined by the appended claims.

What is claimed is:

1. A storage device, comprising:
a volatile memory including a memory cell array, which has a plurality of sub-cell arrays therein, and a plurality of sub-wordline driver blocks, which are configured to drive sub-wordlines electrically connected to at least one of the plurality of sub-cell arrays; and
a storage controller configured to control the volatile memory, said storage controller comprising:
a volatile memory interface configured to transmit data to and receive data from the volatile memory, and detect an error bit(s) of data output from the volatile memory;
a working memory configured to store a structure map table, which maps unit areas of the volatile memory, the sub-wordlines, and the plurality of sub-wordline driver blocks; and
a processor configured to: update an error count of a unit area of the volatile memory that corresponds to the error bit(s) detected from the volatile memory interface to the structure map table, detect at least one of a defective sub-wordline and defective sub-wordline driver block, by accessing the structure map table, and then repair at least one memory cell connected to the defective sub-wordline and/or repair at least one memory cell associated with the defective sub-wordline driver block, in response to the detection of the at least one of a defective sub-wordline and defective sub-wordline driver block.

2. The storage device of claim 1,
wherein each of the plurality of sub-cell arrays includes redundancy memory cells;
wherein the sub-wordline driver blocks are configured to drive redundancy sub-wordlines connected to redundancy memory cells included in one or more sub-cell arrays among the plurality of sub-cell arrays;
wherein the processor provides a post package repair (PPR) command to the volatile memory to repair memory cells connected to the defective sub-wordline; and
wherein the volatile memory is configured to, in response to the PPR command, move data stored in memory cells connected to the defective sub-wordline to redundancy memory cells connected to a redundancy sub-wordline driven in a sub-wordline driver block in which the defective sub-wordline is driven, and remap a physical address of the defective sub-wordline to a physical address of the redundancy sub-wordline.

3. The storage device of claim 1,
wherein the volatile memory further includes a plurality of reserved sub-cell arrays and reserved sub-wordline driver blocks, which are configured to drive reserved sub-wordlines connected to one or more reserved sub-cell arrays among the plurality of reserved sub-cell arrays; and
wherein the processor is configured to: control the volatile memory to move data of memory cells related to the defective sub-wordline driver block to memory cells related to a selected sub-wordline driver block among the reserved sub-wordline driver blocks, and store a remap table in the working memory for remapping logical addresses related to the defective sub-wordline driver block to logical addresses related to the selected reserved sub-wordline driver block.

4. The storage device of claim 3,
wherein the logical addresses allocated to the volatile memory include a remap flag; and
wherein, the processor is configured to, when the remap flag of a logical address to be accessed is set, convert the logical address to be accessed by referring to the remapping table of the working memory to a remapped logical address, and access the volatile memory using the remapped logical address.

5. The storage device of claim 4, wherein the processor includes a cache memory, and is configured to: determine whether a tag included in the remapped logical address is included in a cache line of the cache memory to access the volatile memory using the remapped logical address, and obtain data from the cache line when the tag is included.

6. The storage device of claim 4, wherein the plurality of reserved sub-cell arrays are included in the memory cell array.

7. The storage device of claim 4, wherein the plurality of reserved sub-cell arrays are included in a memory cell array different from the memory cell array.

8. The storage device of claim 1, wherein the processor is configured to: determine one or more unit areas related to each of the sub-wordlines by referring to the structure map table, determine an error count of each of the sub-wordlines based on an error count of the one or more unit areas, and detect a sub-wordline of which an error count exceeds a threshold among the sub-wordlines as the defective sub-wordline.

9. The storage device of claim 1, wherein the processor is configured to: determine unit areas related to each of the sub-wordline driver blocks by referring to the structure map table, determine an error count of each of the sub-wordline driver blocks by summing error counts of the determined unit areas, and detect a sub-wordline driver block having an error count exceeding a threshold among the sub-wordline driver blocks as the defective sub-wordline driver block.

10. The storage device of claim 1, wherein unit areas of the volatile memory are identified by logical addresses allocated to the volatile memory.

11. The storage device of claim 1, wherein each of unit areas of the volatile memory corresponds to memory cells connected to a sub-wordline in one of the plurality of sub-cell arrays.

12. The storage device of claim 1,
wherein the storage device further includes a nonvolatile memory controlled by the storage controller; and
wherein the processor is configured to store the structure map table in the nonvolatile memory when the storage device is powered off.

13. The storage device of claim 12, wherein the processor further includes a host interface, which is configured to transmit data to and receive data from a host depending on a non-volatile memory express (NVMe) standard.

14. The storage device of claim 1,
wherein the storage controller further includes a nonvolatile memory; and
wherein the processor is configured to store the structure map table in the nonvolatile memory when the storage device is powered off.

15. The storage device of claim 14, wherein the processor further includes a host interface, which is configured to transmit data to and receive data from a host, based on a compute express link (CXL) standard.

16. The storage device of claim 1, wherein the processor is configured to repair the memory cells in an idle state of the storage device.

17. A storage device, comprising:
first and second volatile memories, which respectively include a memory cell array including multiple sub-cell arrays, and sub-wordline driver blocks configured to drive sub-wordlines connected to one or more sub-cell arrays among the multiple sub-cell arrays; and
a storage controller configured to control the first and second volatile memories;
wherein the multiple sub-cell arrays and the sub-wordline driver blocks of the first and second volatile memories have different connection structures relative to each other; and
wherein the storage controller includes:
a first volatile memory interface configured to transmit data to and receive data from the first volatile memory, and a second volatile memory interface configured to transmit data to and receive data from the second volatile memory;
a working memory configured to store a first structure map table representing mapping of a unit area, a sub-wordline, and a sub-wordline driver block of the first volatile memory, and a second structure map table representing mapping of a unit area, a sub-wordline, and a sub-wordline driver block of the second volatile memory; and
a processor configured to: update error counts for each unit area of the first and second volatile memories to the first and second structure map tables, respectively, detect a defective sub-wordline or a defective sub-wordline driver block by referring to the first and second structure map tables, and repair memory cells connected to the defective sub-wordline or to repair memory cells related to the defective sub-wordline driver block depending on a result of the detection.

18. The storage device of claim 17, wherein a size of a unit area of the first volatile memory and a size of a unit area of the second volatile memory are different.

19. A storage device, comprising:
a volatile memory; and
a storage controller configured to control the volatile memory;
wherein the volatile memory includes:
a memory cell array including a plurality of sub-cell arrays including memory cells connected to a plurality of unit wordlines, wherein the plurality of sub-cell arrays are arranged in a first direction, and
sub-wordline driver blocks adjacent to one or more of the sub-cell arrays in the first direction, and including a plurality of sub-wordline drivers, which are each configured to drive one or more unit wordlines connected to one or more adjacent sub-cell arrays as a single sub-wordline; and
wherein the storage controller is configured to: determine memory cells connected to the plurality of unit wordlines as a unit area, detect a defective sub-wordline among the plurality of sub-wordlines based on an error count of one or more unit areas related to the plurality of sub-wordlines included in the volatile memory, and repair one or more unit areas related to the defective sub-wordline depending on a result of the detection.

20. The storage device of claim 19, wherein the storage controller is configured to: detect a defective sub-wordline driver block among the plurality of sub-wordline driver blocks based on an error count of a plurality of unit areas related to the plurality of sub-wordline drivers, and repair a plurality of unit areas related to the defective sub-wordline driver block.

* * * * *